Nov. 22, 1960      M. NESME      2,961,111

CROWN CORKS

Filed April 3, 1959

Inventor
Maurice Nesme
By Michael S. Striker
Attorney

United States Patent Office

2,961,111
Patented Nov. 22, 1960

2,961,111
CROWN CORKS
Maurice Nesme, 12 Place Jeanne d'Arc,
Neufchateau, Vosges, France
Filed Apr. 3, 1959, Ser. No. 803,946
Claims priority, application France May 7, 1958
8 Claims. (Cl. 215—39)

The present invention relates to an improved crown-cork.

It is well-known that in the sealing of bottles ever-increasing use is being made of crown-corks which include, in place of the usual sealing disk made of cork and covered with a "spot" or not, a sealing gasket made of plastic or the like material provided at its centre with a projecting portion adapted to form a plug extending into the neck of the bottle to be sealed. In order to make it possible easily to recover the plastic sealing gasket after the bottle has been uncorked in order to use it as a re-corking plug, various methods of mounting the sealing gasket within the metallic cap have heretofore been considered. Broadly, all the known mounting means aim at providing a sufficiently firm connection between the sealing gasket and the metal cap to ensure that prior to sealing a bottle it will not be able to separate from said cap, while at the same time the connection between the sealing gasket and the metal cap is such, that on removal of the crown-cork with a crown-cork opener, only the metal cap will be removed from the bottle neck while the plastic gasket remains in position upon said bottle neck owing to the penetration of its projecting part into said neck.

The results obtained with crown-corks including, as described above, a metal cap and a plastic sealing gasket removably secured to the cap, are not fully satisfactory in that on uncorking a bottle the metal cap carries the plastic gasket away with it, so that in order to recover the plastic gasket for use as a recorking plug, it is necessary to detach the plastic seal from the metal cap by one means or another.

Another drawback of crown-corks as specified above resides in the fact that a considerable portion of the plastic gasket remains uncovered, so that when such a crown-cork is being used for sealing a bottle holding a liquid containing carbonic acid gas, the latter can easily escape, since the plastic material used in the manufacture of the gasket, as is well-known, is not impervious to gases and especially to carbonic acid gas.

The invention has as its object the provision of an improved crown-cork, which includes in a known manner a metal cap and a sealing gasket of plastic material, but with both these elements however being so attached to one another that the plastic gasket, while remaining unitarily bonded to the metal cap throughout the operations preceding the sealing of a bottle will separate completely from the metal cap on removal of the crown-cork and will remain in sealing position upon the bottle neck while the said metal cap is detached therefrom.

Another advantage of the invention lies in the fact that the crown-cork is so arranged as to prevent any escape of gas and especially carbonic acid gas.

Further features and advantages of the invention will stand out from the ensuing description with reference to the accompanying drawing, which illustrates on an enlarged scale, diagrammatically and by way of example only, one form of embodiment of an improved crown-cork.

Figure 1:
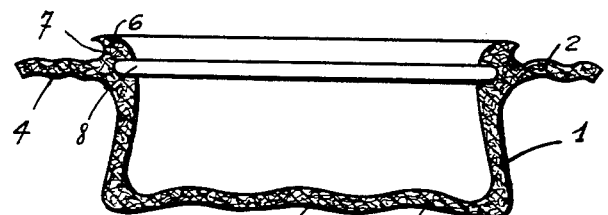
Fig. 1 is a sectional elevational view of the sealing gasket for an improved crown-cork according to the invention.

In the exemplary embodiment shown (see Figs. 1 and 2), the sealing gasket includes a recessed body 1 in the form of a plug provided around its periphery with a flange 2 adapted to form the seal proper, both said flange and the bottom end wall 3 of the body 1 preferably being provided in known fashion with wavy portions such as 4 and 5 respectively.

The aforesaid body 1 projects slightly beyond the peripheral flange 2 defining a collar 6 externally formed with a peripheral circumferential groove 7.

Moreover, the body 1 is provided in its inner surface and substantially on a level with the peripheral flange 2, with an inner circular groove 8.

Figure 3:
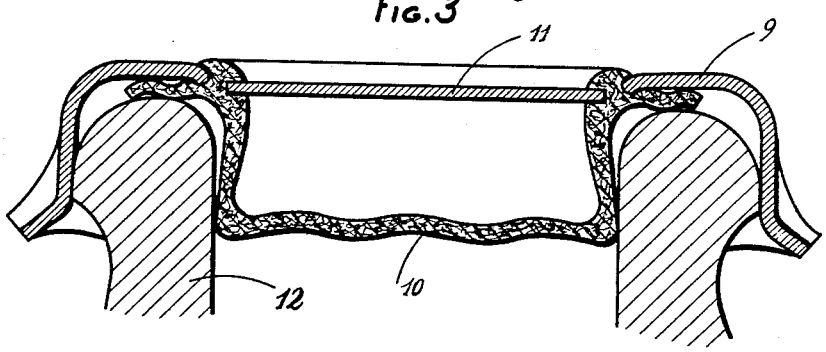
Fig. 3 is an elevational sectional view of a crown-cork positioned on the neck of a bottle but not yet crimped thereover.
Figure 4:
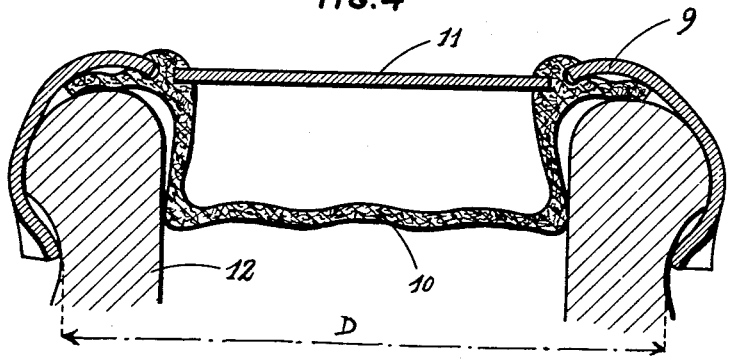
Fig. 4 is a view similar to Fig. 3 but in which the crown-cork is shown as having been crimped.

To secure the sealing gasket just described to the metal cap 9 of a crown-cork, a hole is first perforated in the end wall of said cap of sufficient diameter to enable the sealing gasket generally designated 10 in Figs. 3 and 4 to be snapped into engagement with the metal cap 9 after the manner of a snap-fastener, by inserting the peripheral edge of the hole formed in the end wall of said cap 9 into the groove 7.

Figure 2:
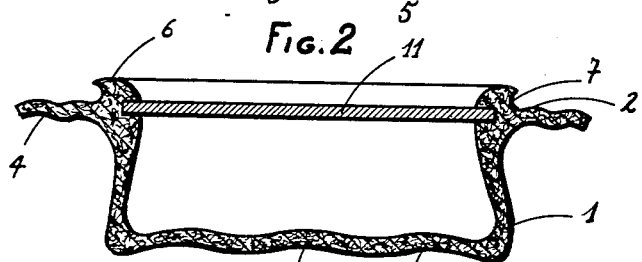
Fig. 2 is a view similar to Fig. 1 with the gasket shown provided with its associated metal sealing disk or washer.

Preferably, the perforation of the hole in the end wall of the metal cap 9 is so effected that it will result in a disk 11 of a diameter such that it can be rigidly bonded with the sealing gasket 10 by insertion into the annular groove 8, as is clearly apparent from Figs. 2 to 4. If more convenient, the disk or washer 11 may of course be produced separately from the crown-cork.

As concerns the diameter of the peripheral flange 2 of the sealing gasket, this is determined so as to be less than the smallest diameter which is liable to be defined by the free end of the corrugated skirt of the metal cap 9 after the crown-cork has been crimped over the neck 12 of a bottle. In other words the diameter of the peripheral flange 2 is so determined as to be less than the diameter designated D in Fig. 4.

Tests performed with the improved crown-cork as just described have demonstrated that on opening a bottle only the metal cap 9 separates from the bottle neck 12, while the sealing gasket 10 remains inserted in plugging position in said bottle neck 12. This is a very important advantage and results in part from the diameter adopted for the peripheral flange 2, and in part from the rigidity imparted to the gasket 2 by the disk 11.

Another advantage of the invention resides in the fact that the metal disk 11 which seals the recessed body 1 of the sealing gasket, effectively resists any leakage of gas through this gasket, said disk further having the additional effect of serving as a kind of spacer and preventing distortion of the sealing gasket 10 on opening of the bottle, said gasket being thus prevented from following the skirt of the crown-cork and thus contributes to the non-displacement of the plastic gasket during the unsealing operation.

It should be observed, in addition, that there is nothing to prevent the inscription of printed matter on the apparent face of the metal disk 11, so that even after a bottle has been opened the seal used as a recorking plug makes it possible to identify the contents of a previously unsealed and possibly partly-empty bottle.

It is obvious that the invention has only been described and illustrated in a purely explanatory and in no way in a restrictive sense and that various modifications may be made in the details of the form of embodiment disclosed without thereby exceeding the scope of the invention.

What I claim is:

1. A crown-cork assembly comprising in combination a crown-cork having a flat wall with a hole therein and a corrugated skirt, a combined seal-and-plug member comprising a unitary piece of yieldable material having a recessed depending plug portion engageable in the neck of a bottle to be sealed by said assembly and a radial sealing flange portion projecting outward from said member adjacent the top thereof, an external circumferential groove defined in the outer periphery of said member above and adjacent said flange and tightly but removably engageable with the periphery of said hole in the crown-cork wall so that said flange will underlie a rim portion of the crown-cork wall in sealing engagement with the top of said bottle to be sealed, an internal circumferential groove formed in said recessed member adjacent to but spaced from the top thereof, and a disk of substantially rigid material engaged in said internal groove to provide a closure across the recess in said member, whereby removal of said crown-cork with a crown-cork opening means will disengage said edge of the hole in the crown-cork wall out of said external groove in the plug thereby to remove the crown-cork while allowing said plug member to remain in the bottle as a re-usable plugging means therefore.

2. The assembly claimed in claim 1, wherein said gasket-and-plug member is made of plastic material.

3. The assembly claimed in claim 1, wherein said internal groove lies substantially in a common plane with said radial flange.

4. The assembly claimed in claim 1, wherein the outer diameter of said sealing flange is somewhat smaller than the smallest diameter of said crown-cork skirt after the latter has been crimped over the neck of a bottle to be sealed by said assembly.

5. The assembly claimed in claim 1, wherein said disk is made of metal.

6. The assembly claimed in claim 1, wherein said disk is punched out of said crown-cork wall on forming said hole therein.

7. A crown-cork having a hole punched coaxially therein, a plastic plugging member having an outer peripheral groove snappable into and out of engagement with said hole and a recessed depending plugging portion, an inner circumferential groove in said member and a substantially rigid disk inserting into said inner groove to provide a closure across said recess and permit retention of said member in a bottle sealed by said crown-cork as a re-usable plugging means therefore on removal of the crown-cork from said bottle.

8. For use in a crown-cork assembly of the type described, a combination sealing and re-usable plugging member comprising a unitary piece of plastic material in the general form of an inverted hat, the crown of said hat providing a plugging portion and the rim of said hat providing a sealing flange portion, an outer circumferential groove formed around said member between said flange and the adjacent end of said member adapted for in-and-out snapping engagement with a hole formed in a crown-cork, and an inner circumferential groove formed in said member for reception of a relatively stiff disk providing a closure across the recess defined by said crown of the hat.

References Cited in the file of this patent
UNITED STATES PATENTS 771,712     Coale et al. _____ Oct. 4, 1904

FOREIGN PATENTS 219,234     Australia _____ Nov. 27, 1958